US009184841B2

(12) United States Patent
Robinson et al.

(10) Patent No.: US 9,184,841 B2
(45) Date of Patent: Nov. 10, 2015

(54) MULTI-LEVEL DECODER WITH SKEW CORRECTION

(71) Applicant: Avago Technologies General IP (Singapore) Pte. Ltd., Singapore (SG)

(72) Inventors: Mike Allen Robinson, Fremont, CA (US); David W. Dolfi, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/020,399

(22) Filed: Sep. 6, 2013

(65) Prior Publication Data

US 2015/0071653 A1 Mar. 12, 2015

(51) Int. Cl.
*H04L 25/34* (2006.01)
*H04L 25/49* (2006.01)
*H04B 10/2507* (2013.01)
*H04B 10/60* (2013.01)

(52) U.S. Cl.
CPC ............ *H04B 10/2507* (2013.01); *H04B 10/60* (2013.01)

(58) Field of Classification Search
CPC .... H04B 10/2057; H04B 10/60; H04L 25/14; H04L 25/4925; H04L 5/20; H04L 25/0272; H04L 5/003; H04L 25/4917
USPC .................................. 375/286–288, 290, 291
See application file for complete search history.

(56) References Cited

U.S. PATENT DOCUMENTS

| | | | |
|---|---|---|---|
| 7,095,788 B1 * | 8/2006 | Cao et al. | 375/257 |
| 7,110,681 B1 | 9/2006 | Mizuochi | |
| 7,113,550 B2 | 9/2006 | Stonecypher et al. | |
| 7,308,058 B2 | 12/2007 | Zerbe et al. | |
| 7,447,278 B2 | 11/2008 | Menolfi et al. | |
| 8,385,439 B2 | 2/2013 | Djordjevic et al. | |
| 2006/0111074 A1 | 5/2006 | Petilli et al. | |
| 2007/0025283 A1 * | 2/2007 | Koslov | 370/316 |
| 2009/0051675 A1 * | 2/2009 | Huang | 345/204 |
| 2011/0069784 A1 | 3/2011 | Petilli | |
| 2012/0016650 A1 | 1/2012 | Hollis | |
| 2013/0241622 A1 | 9/2013 | Zerbe et al. | |

FOREIGN PATENT DOCUMENTS

EP 1712055 1/2013

OTHER PUBLICATIONS

"Coherent Lightwave Signal Analyzer", OM4000 Series Datasheet, Mar. 5, 2013, Tektronix, 16 pages.

Lee et al., "Design and Comparison of Three 20-Gb/s Backplane Transceivers for Duobinary, PAM4, and NRZ Data", IEEE Journal of Solid-State Circuits, vol. 43, No. 9, Sep. 2008, 14 pages.

(Continued)

*Primary Examiner* — Ted Wang

(57) ABSTRACT

An optical communication system, a transmitter, a receiver, and methods of operating the same are provided. In particular, a transmitter is disclosed as being configured to encode optical signals in accordance with a multi-level coding scheme. The receiver is configured to provide skew correction to the optical signals received from the transmitter by dividing a received signal into separate level-specific components and sampling each of the components with distinct sampling blocks.

20 Claims, 8 Drawing Sheets

(56) References Cited

OTHER PUBLICATIONS

Park, "A 4PAM/2PAM Coaxial Cable Receiver Analog Front-End Targeting 40Gb/s in 90-nm CMOS", Graduate Department of Electrical and Computer Engineering, University of Toronto, 2008, 113 pages.

Toifl, et al., "A 22-Gb/s PAM-4 Receiver in 90-nm CMOS SOI Technology", IEEE Journal of Solid-State Circuits, vol. 41, No. 4, Apr. 2006, 12 pages.

* cited by examiner

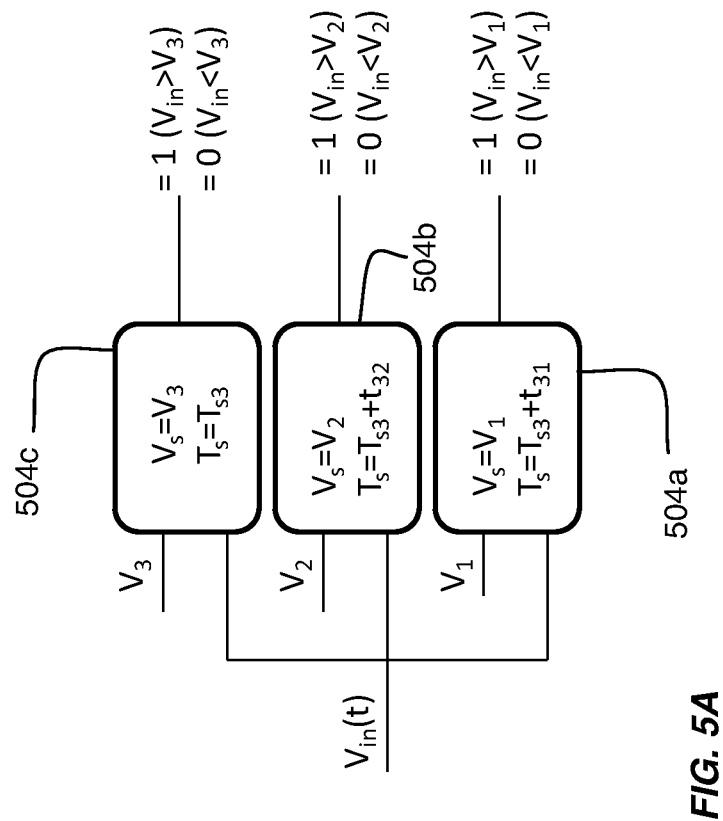
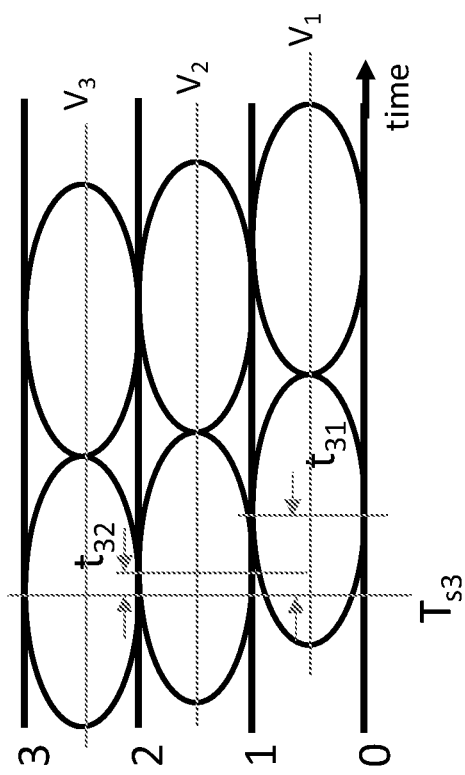
FIG. 5A

| PAM4 Level | $V_{in}$ | $V_{out,1}$ | $V_{out,2}$ | $V_{out,3}$ |
|---|---|---|---|---|
| 0 | $V_{in}<V_1$ | 0 | 0 | 0 |
| 1 | $V_1<V_{in}<V_2$ | 1 | 0 | 0 |
| 2 | $V_2<V_{in}<V_3$ | 1 | 1 | 0 |
| 3 | $V_{in}>V_3$ | 1 | 1 | 1 |

*FIG. 5C*

MULTI-LEVEL DECODER WITH SKEW CORRECTION

FIELD OF THE DISCLOSURE

The present disclosure is generally directed toward data transmission and reception and, in particular, toward elements for use in fiber optic-based data transmission systems.

BACKGROUND

Data transmissions in enterprise optical communication systems have not relied on overly-complicated encoding and/or decoding schemes because the technology has been more than sufficient to support desired data transmission rates. However, as computing devices become faster and the need for increased data transmission rates is realized, the physical limits of optical devices will become a limiting factor. Accordingly, optical communication systems will begin heading toward the use of more complicated encoding and decoding schemes.

Pulse-Amplitude Modulation (PAM) is a form of signal modulation where the message information is encoded in the amplitude of a series of signal pulses. It is pulse modulation scheme in which the amplitudes of a train of carrier pulses are varied according to the sample value of the message signal. Demodulation of a PAM-encoded signal is performed by detecting the amplitude level of the carrier at every symbol period.

In a PAM4-based optical link, two Non-Return-to-Zero (NRZ)-coded two-level signals are combined together in a PAM4 encoder to create a single PAM four-level signal. The advantage of this encoding scheme is that the 4-level code utilizes the same baud, or symbol rate, of either of the two NRZ codes while containing twice the information of either. This is an attractive solution when the components of the link are baud rate limited, as is often the case for very high-speed fiber links. FIG. 1A depicts eye diagrams of the individual NRZ signals and FIG. 1B depicts the combined PAM4 signal. As seen in the comparison of FIGS. 1A and 1B, the PAM4 signal is capable of carrying twice the information of two individual NRZ signals in the same baud period.

BRIEF DESCRIPTION OF THE DRAWINGS

The present disclosure is described in conjunction with the appended figures, which are not necessarily drawn to scale:

FIG. 5A depicts a solution for decoding a PAM4-encoded signal in accordance with embodiments of the present disclosure;

FIG. 5C depicts a table describing operations of the circuit depicted in FIG. 5B.

DETAILED DESCRIPTION

Various aspects of the present disclosure will be described herein with reference to drawings that are schematic illustrations of idealized configurations.

While certain examples of systems and methods will be described with reference to a particular multi-level digital encoding scheme, embodiments of the present disclosure are not so limited. More specifically, while certain embodiments of the present disclosure are depicted and described in connection with a PAM4 signal, it should be appreciated that embodiments of the present disclosure are not limited to systems utilizing PAM4 encoding. Rather, embodiments of the present disclosure have applicability to more complicated coding schemes. The examples of a PAM4 encoding scheme are intended to provide an easy-to-understand example or set of examples. It should be appreciated that the concepts disclosed herein can be applied to any type of multi-level encoding scheme (e.g., PAM5, PAM6, PAM8, PAM32, etc.).

Moreover, embodiments of the present disclosure may be applied to any system in which skew and/or delay is introduced across different levels of a multi-level encoded signal. Embodiments of the present disclosure are not necessarily limited to system, which employ a laser to modulate the signals. The embodiments described herein reference the use of lasers for signal modulation since it has been observed that a laser's have a particular non-linear behavior at different levels. It should, however, be apparent to those of ordinary skill in the art that embodiments of the present disclosure are not so limited.

Figure 1:
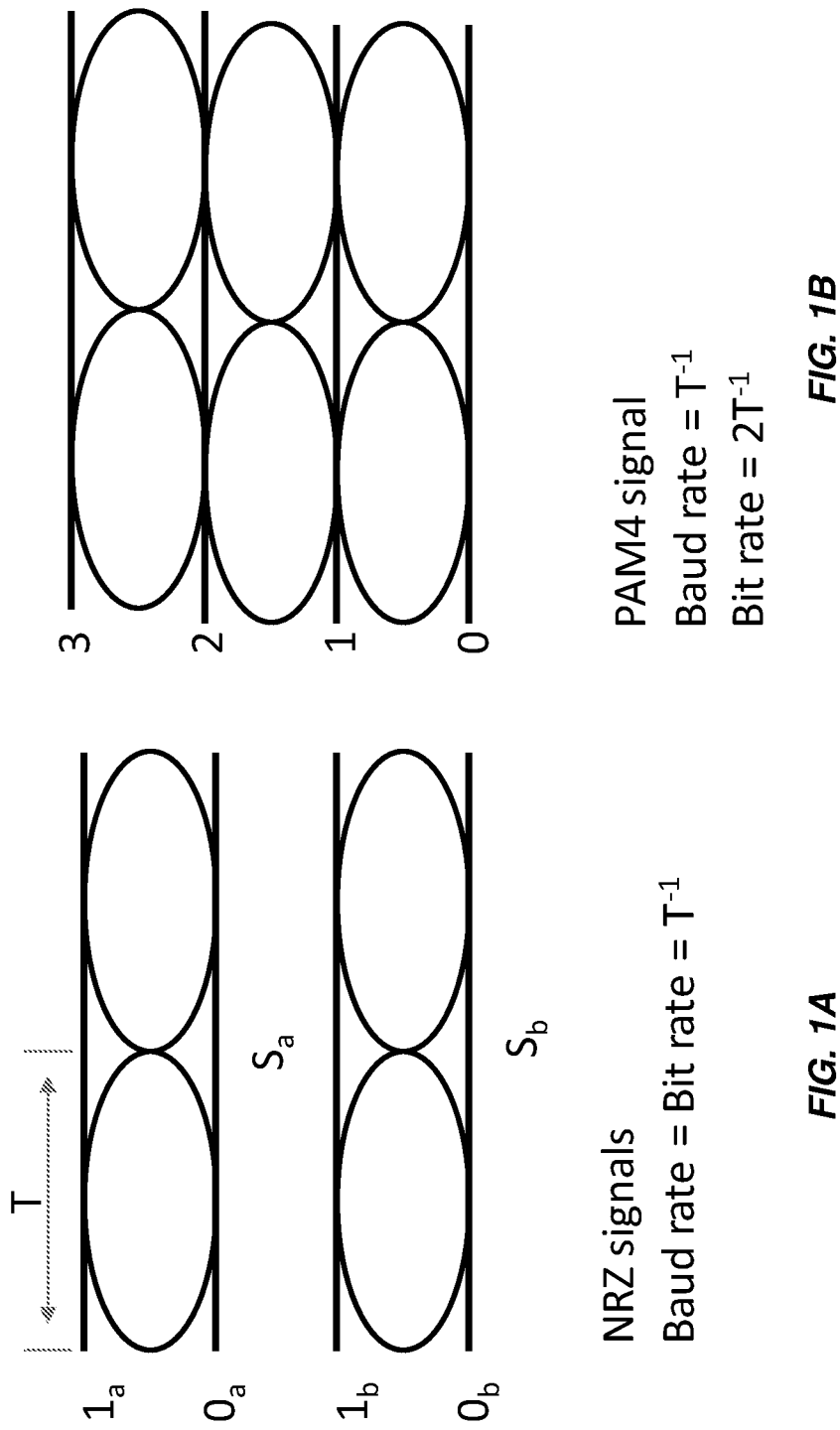
FIG. 1A depicts a pair of NRZ signals transmitted between a transmitter and receiver.
FIG. 1B depicts a PAM4 signal transmitted between a transmitter and receiver.
Figure 2:
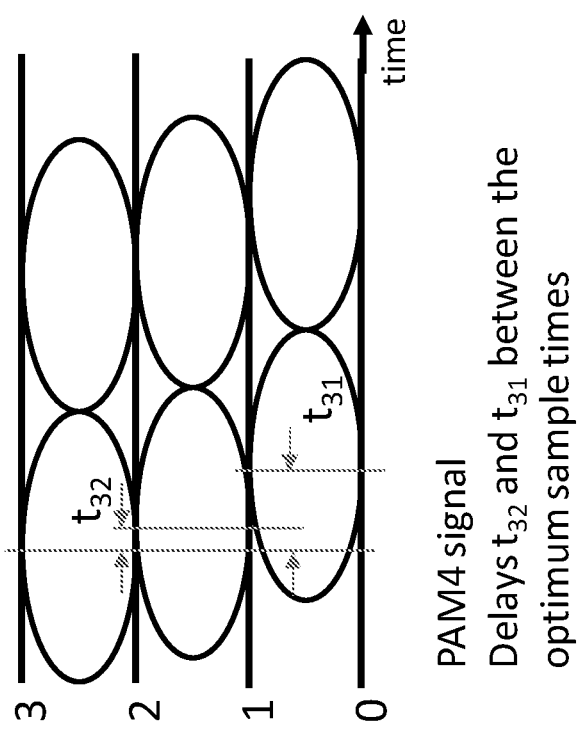
FIG. 2 depicts a PAM4 signal received at a receiver where the optical modulation which creates the PAM4 signal is supplied by directly modulating a laser in accordance with embodiments of the present disclosure.

In particular, while multi-level encoding is useful for increasing the data transmission rate of a communication system, the price paid for this encoding technique is the additional complexity of introducing the multi-level encoded signal at the transmit end and accurately decoding the signal at the receiving end. More specifically, as a non-limiting example, complications arise in decoding when the optical modulation which creates the optical PAM4 signal is supplied by directly modulating a laser. Due to the inherent non-linear behavior of semiconductor lasers, the laser's modulation speed is dependent on the drive level of the current that is supplying the modulation signal. In a PAM4 situation, this implies that the response of the laser is fastest at the upper levels and slowest at the lower levels. This creates both a distortion in the optical eyes as well as a skew in the arrival time at the receive end of the communications link. This skewing effect is depicted, as an example, in FIG. 2. As can be seen in FIG. 2, delays t32 and t31 are introduced to levels 2 and 1, respectively as compared to the time the signal of level 3 is received. Thus, there exists a difference between the optimum sample times for each level in the multi-level signal. Said another way, because the signal was encoded with a device having non-linear behavior across the levels, one level of the multi-level signal is received later than another level, thereby causing the optimum sampling times for each level to occur at different times.

Figure 3:
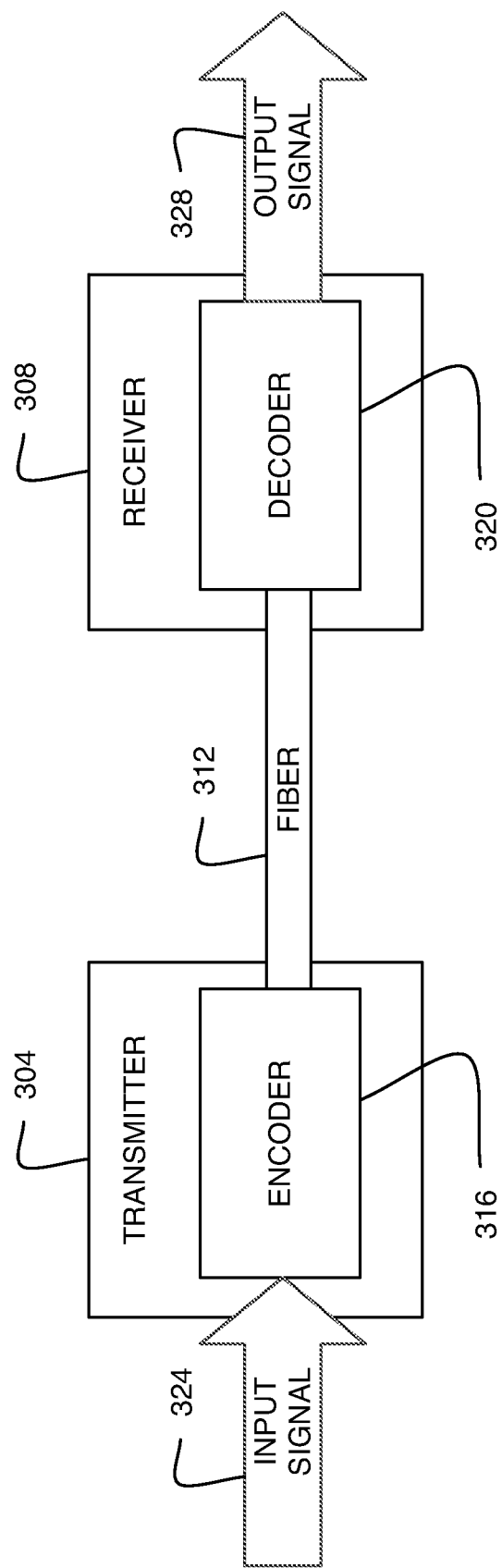
FIG. 3 is a block diagram depicting a data transmission system in accordance with embodiments of the present disclosure.

With reference now to FIG. 3, an illustrative system 300 for addressing the skew depicted in FIG. 2 will be described in accordance with embodiments of the present disclosure. Specifically, the communication system 300 is depicted as including a transmitter 304 and receiver 308 connected by an optical fiber link 312. The length of the optical fiber link 312 may be as small as a few meters or as long as several kilometers. The transmitter 304 and/or receiver 308 may be associated with a common computer network or may be separated by one or several communication networks. In some embodiments, the transmitter 304 and/or receiver 308 may be operating in a signal boosting station rather than being incorporated into a computing network.

In some embodiments, the transmitter 304 receives an input signal 324 from some computing device or from another fiber link. The transmitter 304 includes an encoder 316 that is configured to encode the input signal 324 and prepare the signal for transmission across the optical fiber link 312. In some embodiments, the encoder 316 comprises a laser (e.g., semiconductor laser) or similar source of coherent light. The encoder 316 may be driven by an input current and, in some embodiments, the encoder 316 may be configured to encode the input signal into a multi-level encoded signal. However, the encoder 316 may inherently skew the multi-level encoded signal.

The multi-level encoded signal may then be transmitted by the encoder 316 across the optical fiber link 312 where the encoded signal is received at the receiver 308. The receiver 308 may be configured to employ a decoder 320 to decode the multi-level encoded signal and produce a corresponding output signal 328. In some embodiments, the decoder 320 is configured to account for or otherwise correct the skew introduced into the signal by the encoder 316. In some embodiments, the decoder 320 may comprise a plurality of discrete decoding elements that are each adapted to sample different levels of the multi-level encoded signal transmitted by the encoder 316.

Figure 4:
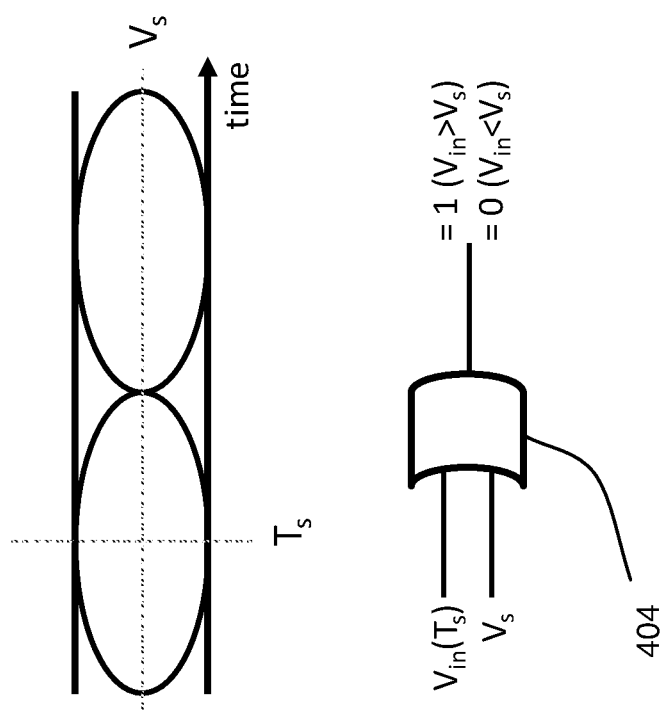
FIG. 4 depicts a simplified solution for decoding an NRZ-encoded signal.

As shown in FIG. 4, in NRZ-based optical links, the signal clock is recovered to determine the optimum sampling time Ts to sample the eye, and the signal level Vs corresponding to the middle of the eye is determined and used as a reference. The level of incoming bits are sampled at the optimum sampling time Ts and compared to the reference level Vs with a comparator 404. The bit is determined to be a one or zero depending on whether or not the received voltage (e.g., Vin) is greater or less, respectively, than the reference level (e.g., Vs).

As depicted in FIG. 5A, in a PAM4 signal, by comparison, there are three eyes and hence three reference levels V1, V2, V3 that require a comparison, thereby complicating the situation. In addition, the skew problem associated with a direct laser modulation scheme makes the optimization more problematic since the optimum time for bits with values in the upper eye (e.g., level 3) is earlier in time that that for the lower eyes (e.g., level 2 or level 1).

Simulations of real world PAM4 links with direct laser modulation show significant gains in signal-to-noise ratio (and hence in bit error rate) when the eyes are sampled at their individual optimum times, which as discussed above, will be skewed due to the non-linear behavior of the encoder 316. To achieve optimization, embodiments of the present disclosure propose to divide an input signal as shown in FIG. 5A and create separate sampling times as well as separate signal levels for each eye. More specifically, each line's reference voltage V1, V2, V3 is input to a different decoding element 504a, 504b, 504c, respectively.

In the depicted embodiment, the third decoding element 504c is configured to sample the input voltage Vin at a non-delayed sample time Ts3 and compare the sampled input voltage Vin to the third reference voltage V3. The sample time for the second decoding element 504b, however, is delayed as compared to the third decoding element 504c. More specifically, the second decoding element 504b is shown to sample the input voltage Vin at a first delayed sample time Ts3+t32, where t32 is substantially equal to the delay between levels 2 and 3. In some embodiments, the delay t32 is a fraction of the sample time Ts. As an example, if Ts is 40 picoseconds, then the delay t32 may be on the order of 1 to 4 picoseconds, depending on the properties of the encoder. This means that the delay t32 can be up to 10% of the sample time—a non-trivial amount. Continuing the example of FIG. 5A, the lowest level (e.g., level 1) is most delayed as compared to the highest level (e.g., level 3). In this example, the delay between the highest level and lowest level is a maximum delay of t31, which may be on the order of 4 to 8 picoseconds, which could be up to about 20% of the sample time. Thus, the first decoding element 504a delays it's sampling of the input voltage Vin until a delayed sample time Ts3+t31, thereby ensuring that the first level is sampled at the optimum time. In this way, the individual bit levels are sampled in an optimal way by discrete decoding elements 504a, 504b, 504c and signal-to-noise is enhanced for each level. The input voltage at each discrete sampling time is compared to the appropriate reference voltage to determine whether each level should output a logical 1 or 0.

Figure 5B:
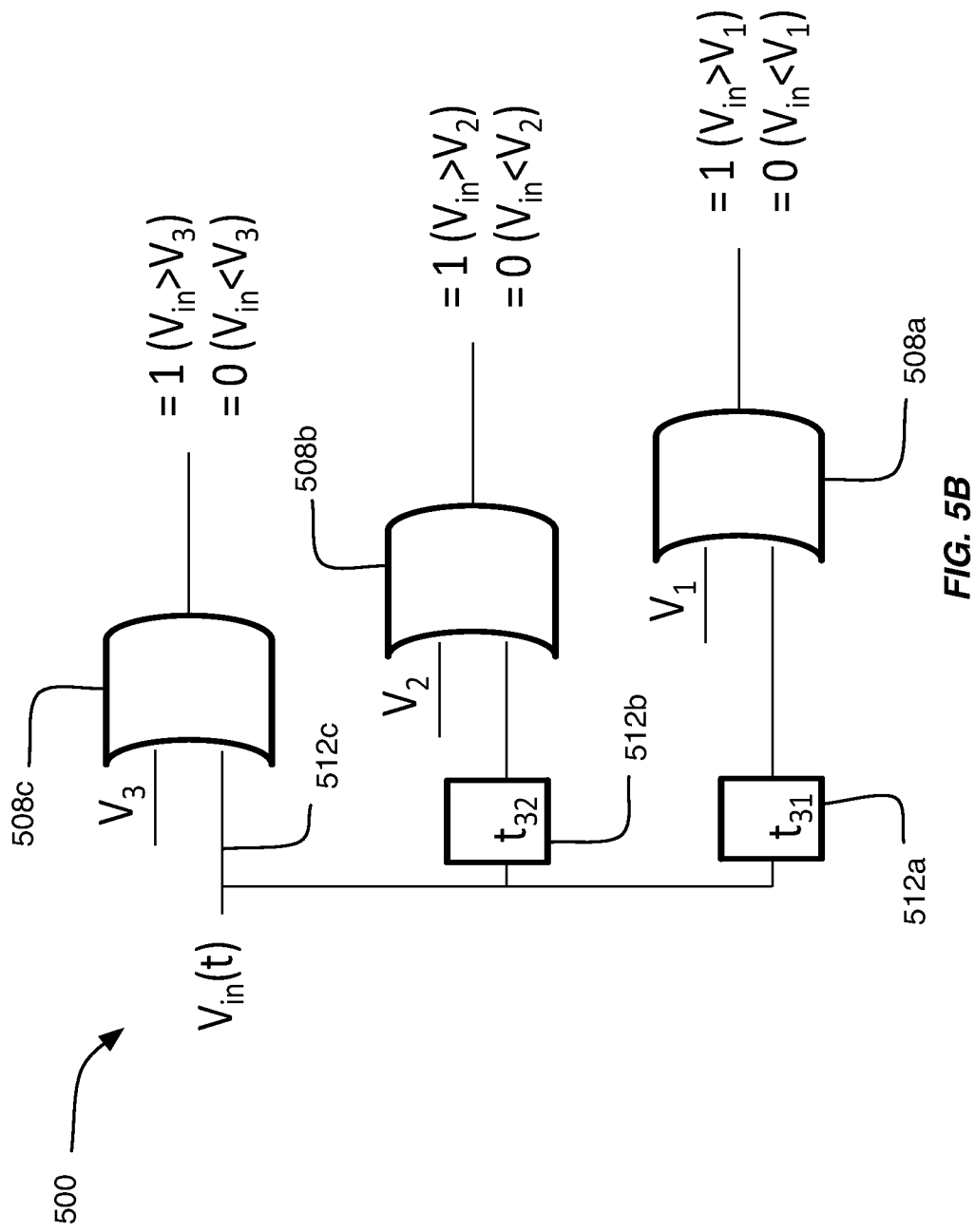
FIG. 5B depicts a circuit diagram for a digital decoding circuit in accordance with embodiments of the present disclosure.

FIG. 5B depicts a particular circuit 500 that can be utilized to achieve the above-noted optimization. In the example of a PAM4 signal, three individual comparators 508a, 508b, 508c are used and each comparator 508c receives the same input voltage Vin, which varies as a function of time. As shown in FIG. 5B, each comparator 508a, 508b, 508c may be configured to sample the input voltage Vin at different sample times. Specifically, individual delay elements 512a, 512b, 512c, may be provided to delay each comparator 508a, 508b, 508c, respectively. More specifically, the circuit 500 is shown to include delay elements 512a, 512b, 512c that increase sampling delays for the lower levels, where the lowest level comparator 508a is delayed by the largest amount. Increasing delays for the lower levels helps to ensure that each level of the encoded signal is sampled at the optimal time for that level. Specifically, since the encoder 316 may have introduced a skew from one level to the next, the delay elements 512a, 512b, 512c are configured to remove the skew between levels prior to the comparison step being performed at the comparators 508a, 508b, 508c. In some embodiments, the amount by which the sample times are delayed by the delay elements 512a, 512b, 512c may be pre-configured. In some embodiments, the amount by which the sample times are delayed by the delay elements 512a, 512b, 512c may be adjustable, either during manufacture of the decoder 308, or during installation of the decoder 308 into the system 300. Further still, the amount of delay introduced by the delay elements 512a, 512b, 512c may be configured dynamically after the system has been installed and/or while the system is running.

Although FIG. 5B depicts the third delay element 512c as not introducing any delay prior to the third comparator 508c, it should be appreciated that all of the lines may have some amount of delay introduced prior to comparison but the lower levels are further delayed as compared to the delay for the highest level, whether such delay is introduced by an actual delay element 512 or inherently introduced by the traces of the circuitry 500. It should also be noted that while FIG. 5B depicts three comparators 508a, 508b, 508c for decoding a 4-level amplitude modulated signal, embodiments of the present disclosure are not so limited. Instead, if a PAM8 encoded signal were transmitted, then the decoder 320 would potentially be provided with seven comparators and seven delay elements. Thus, where N is the number of levels in the multi-level digital signal, the number of comparators and delay elements may be equal to N−1. Another option is to provide N−1 comparators and N−2 delay elements since one of the levels may not require any delay in addition to inherent circuit delays.

By providing multiple delay elements 512a, 512b, 512c, the delays for the middle and lower eye levels of the encoded signal would be adjusted relative to that of the upper eye level. This would effectively de-skew the delay introduced by the non-linear laser response of the transmitter 304. FIG. 5C depicts a table relating the comparator outputs to the original PAM4 signal levels. It should be mentioned that the use of time-delayed comparators as shown in FIG. 3 is not necessarily a requirement of the present disclosure. Instead, embodiments of the present disclosure can operate, with or without delay elements, to separate a multi-level signal into level-specific components and each of the level-specific components can be provided to distinct decoding elements 504a, 504b, 504c. Separation of the decision circuitry 500 into multiple discrete blocks, one for each of the decision levels, provides the ability to adjust the relative time delay of the incoming signal between each level.

Figure 6:
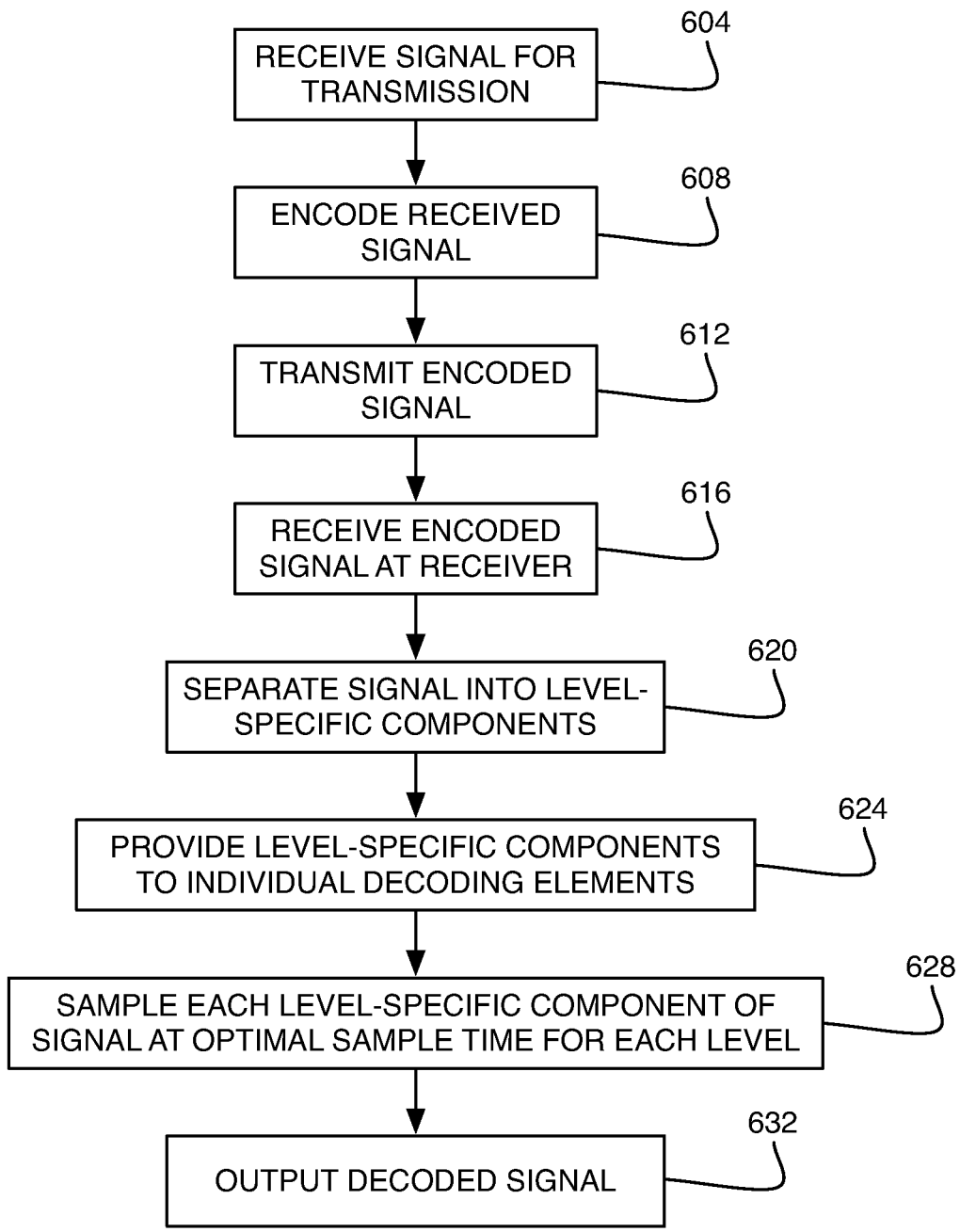
FIG. 6 is a flow chart depicting a decoding method in accordance with embodiments of the present disclosure.

With reference now to FIG. 6, a method of operating a data transmission system will be described in accordance with embodiments of the present disclosure. While the method described herein will refer to an optical-based data transmission system, it should be appreciated that embodiments of the present disclosure are not so limited.

The method begins with the encoder 316 receiving an input signal 324 for transmission across a communications network (step 604). The encoder 316 then encodes the received signal such that the signal can be transmitted across the optical fiber link 312 (step 608). In some embodiments, the encoder 316 encodes the signal using a multi-level amplitude modulation scheme. As a non-limiting example, the encoder 316 encodes the signal by modulating a laser, whose response or encoding speed may be dependent upon the drive level of the current which is supplying the modulation signal. In a PAM4 situation, for example, the response of the laser will be the fastest at the upper levels and slowest at the lower levels.

The encoded signal is then transmitted across the optical fiber link 312 (step 612) where it is received at the receiver 308 (step 616). The receiver 308 then employs its decoder 320 to separate the signal into level-specific components (step 620). As used herein, the level-specific components of the signal may correspond to the signal voltage Vin(t) of the encoded signal, but each level-specific component is delayed in time relative to one another.

The level-specific components are then provided to individual decoding elements 504 (step 624). Each level of the signal is then sampled at the optimal time by a different decoding element 504 (step 628). More specifically, the highest level of the encoded signal may be sampled at a sample time Ts and each lower level may be sampled at a delayed sample time equal to the sample time Ts plus the delay between that level and the highest level. This introduction of delay into the sampling helps to ensure that each level is sampled at its optimal time, thereby enhancing the signal-to-noise ratio for each level.

The decoded signal is then output by the decoder 320 as an output signal 328 (step 632). This output decoded signal may be provided to a computer or computer network for processing or may be re-encoded for re-transmission across another optical fiber link 312. By following the above method and de-skewing the signal output by the encoder 316, the proposed system and method can enhance the signal-to-noise ratio, which improves the Bit Error Rate and improves the performance and robustness of multi-level-coding based communication links.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A data transmission system, comprising:
 a transmitter comprising an encoder configured to encode a signal into an multi-level-coded signal; and
 a receiver configured to receive the multi-level-coded signal, the receiver further comprising a decoder being configured to sample a first level of the multi-level-coded signal at a sample time, Ts, and being further configured to sample a second level of the multi-level-coded signal at a delayed sample time that is delayed with respect to the sample time, Ts, by a predetermined delay amount, wherein the delayed sample time is equal to the sample time, Ts, plus a delay between the first level and the second level.

2. The system of claim 1, wherein the decoder comprises a first comparator configured to sample the first level of the multi-level-coded signal and a second comparator configured to sample the second level of the multi-level-coded signal and wherein a delay element is provided between the input voltage to the second comparator and the input voltage to the first comparator.

3. A data transmission system, comprising:
a transmitter comprising an encoder configured to encode a signal into an multi-level-coded signal; and
a receiver configured to receive the multi-level-coded signal, the receiver further comprising a decoder being configured to sample a first level of the multi-level-coded signal at a sample time, Ts, and being further configured to sample a second level of the multi-level-coded signal at a delayed sample time that is delayed with respect to the sample time, Ts, by a predetermined delay amount, wherein the delayed sample time is substantially an optimal time for sampling the second level of the multi-level-coded signal and occurs after an optimal time for sampling the first level of the multi-level-coded signal.

4. The system of claim 1, wherein the multi-level-coded signal corresponds to an optical signal created by modulating a laser.

5. The system of claim 3, wherein the decoder comprises a first comparator configured to sample the first level of the multi-level-coded signal and a second comparator configured to sample the second level of the multi-level-coded signal and wherein a delay element is provided between the input voltage to the second comparator and the input voltage to the first comparator.

6. The system of claim 1, wherein a first reference signal level is determined for the first level and wherein a second reference signal level is determined for the second level.

7. The system of claim 6, wherein the decoder is configured to compare a first sample value of the multi-level-coded signal to the first reference signal level at the sample time and wherein the decoder is further configured to compare a second sample value of the multi-level-coded signal to the second reference signal level at the delayed sample time, wherein the first sample value and the second sample value are the same value, but delayed in time.

8. A method of decoding a multi-level-coded signal, the method comprising:
receiving the multi-level-coded signal, wherein the multi-level-coded signal corresponds to an optical signal created by modulating a laser;
dividing the multi-level-coded signal into at least a first level-specific component and a second level-specific component;
providing the first level-specific component to a first decoding element;
providing the second level-specific component to a second decoding element; and
individually sampling the first and second level-specific components with the first and second decoding elements, respectively, according to optimal sample times for each of the first and second level-specific components.

9. The method of claim 8, further comprising:
determining an amount of delay between receiving the first level-specific component and the second level-specific component of the multi-level-coded signal; and
delaying a sample time of the second level-specific component as compared to a sample time of the first level-specific component, wherein the sample time of the second level-specific component is delayed by the determined amount of delay.

10. The method of claim 8, further comprising:
dividing the multi-level-coded signal into a third level-specific component;
providing the third level-specific component to a third decoding element; and
enabling the third level-specific component to individually sample the third level-specific component according to an optimal sample time for the third level-specific component.

11. The method of claim 10, wherein the third level-specific component is sampled by a delayed time with respect to the second level-specific component and the first level-specific component.

12. The method of claim 8, wherein the optical signal is received over an optical fiber link.

13. The method of claim 8, wherein the multi-level-coded signal corresponds to an amplitude modulated signal produced by direct laser modulation.

14. The method of claim 8, further comprising:
determining a first reference level for the first level-specific component;
determining a second reference level for the second level-specific component;
sampling the multi-level-coded signal with the first decoding element at a first time to obtain a first sample value;
comparing, with the first decoding element, the first sample value with the first reference level;
based on the comparison of the first sample value with the first reference level, determining a first bit value for the first level-specific component;
sampling the multi-level-coded signal with the second decoding element at a second time to obtain a second sample value, wherein the second time is later than the first time;
comparing, with the second decoding element, the second sample value with the second reference level; and
based on the comparison of the second sample value with the second reference level, determining a second bit value for the second level-specific component, wherein the first bit value and second bit value correspond to bits intended for transmission at substantially the same time by a transmitter of the multi-level-coded signal.

15. A receiver adapted for use in an optical communication system, the receiver comprising:
a first decoder element configured to sample a first level-specific component of a multi-level-coded signal at a first time; and
a second decoder element configured to sample a second level-specific component of the multi-level-coded signal at a second time that is delayed with respect to the first time by a predetermined amount, wherein the first decoder element is configured to compare a first sample obtained at the first time with a first reference level and wherein the second decoder element is configured to compare a second sample obtained at the second time with a second reference level that is different from the first reference level.

16. The receiver of claim 15, wherein the predetermined amount corresponds to a delay between a time at which the first level-specific component is received and a time at which the second level-specific component is received.

17. The receiver of claim 15, wherein the first decoder element comprises a first comparator and wherein the second decoder element comprises a second comparator and a delay element that delays the second comparator with respect to the first comparator.

18. The receiver of claim 15, wherein the multi-level-coded signal is amplitude modulated by direct laser modulation.

19. The receiver of claim 15, further comprising:
a third decoder element configured to sample a third level-specific component of the multi-level-coded signal at a third time that is delayed with respect to the first time and with respect to the second time.

20. The receiver of claim 19, wherein the third decoder element comprises a comparator and a delay element.

* * * * *